Nov. 12, 1968  O. O. KYTTA  3,410,178
VALVE MEANS FOR A FLUID PRESSURE SERVOMOTOR
Filed Aug. 3, 1967  2 Sheets-Sheet 1

INVENTOR.
OSWALD O. KYTTA
BY Richard G. Geib
ATTORNEY

INVENTOR.
OSWALD O. KYTTA
BY
Richard H. Leib
ATTORNEY

United States Patent Office 3,410,178
Patented Nov. 12, 1968

3,410,178
VALVE MEANS FOR A FLUID PRESSURE SERVOMOTOR
Oswald O. Kytta, South Bend, Ind., assignor to The Bendix Corporation, a corporation of Delaware
Filed Aug. 3, 1967, Ser. No. 658,093
22 Claims. (Cl. 91—369)

ABSTRACT OF THE DISCLOSURE

A follw-up type valve means for a pressure differential type servomotor having a swivelable element on either the poppet member or the seat member to permit angular misalignment therebetween without incurring the problem of lapped leakage during such an event.

SUMMARY

Present day servomotors, especially those used in conjunction with power brake systems for automobiles, employ a reciprocating push rod actuated by a pivotably arranged brake pedal. It has been experienced in the operation of these servomotors that there can be angular misalignment between the elements of the valve mechanisms so that the valve seating force is unequal around the periphery of the valve. This has created a problem of lapped leakage in certain types of servomotors which has caused complaints from the operators such as rough idling engines while holding the brake pedal on, etc. It is, therefore, the principal object of this invention to accommodate the various movements involved in operating the servomotor by permitting the valve elements to float with respect to each other whereby lap leakage is eliminated regardless of any misalignment between the valve elements.

DRAWING DESCRIPTION

Figure 1:
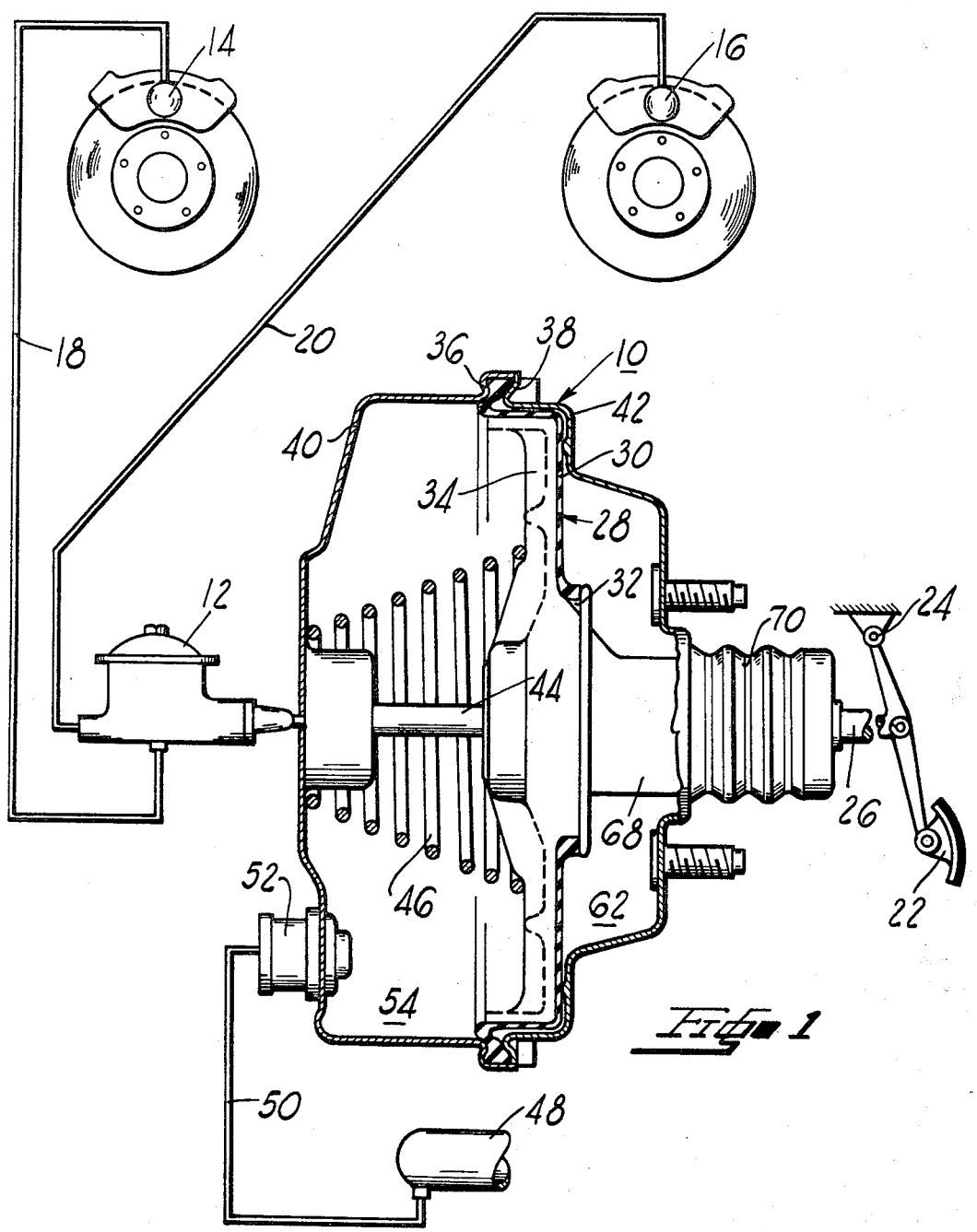
FIGURE 1 is a cross sectional view of a power brake apparatus incorporating a valve mechanism in accordance with the principles of this invention schematically tied in with a braking system for a vehicle.
Figure 2:
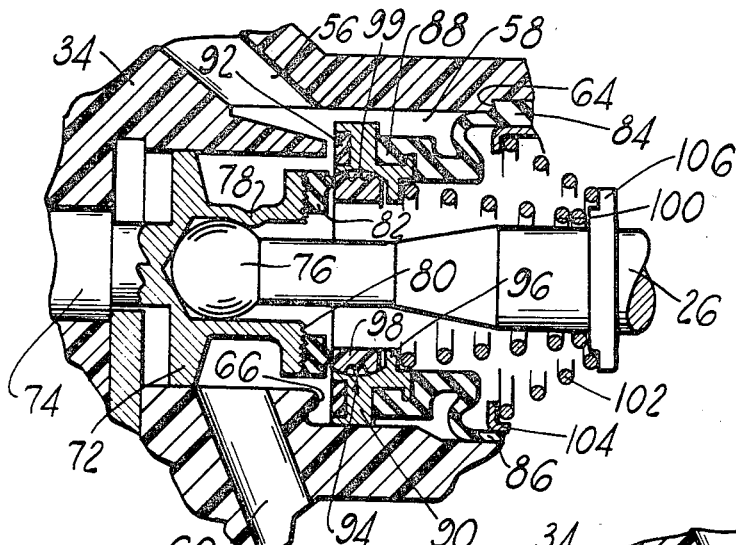
FIGURE 2 is an enlarged cross sectional detail of a portion of the movable wall containing the valve mechanism and having the elements permitting misalignment between the movable seat member and floating poppet member in accordance with the principles of this invention.
Figure 3:
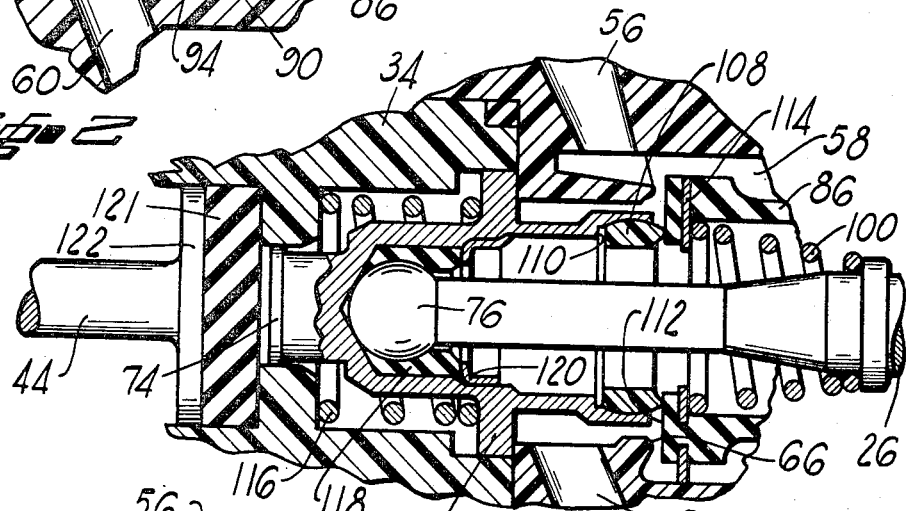
Figure 4:
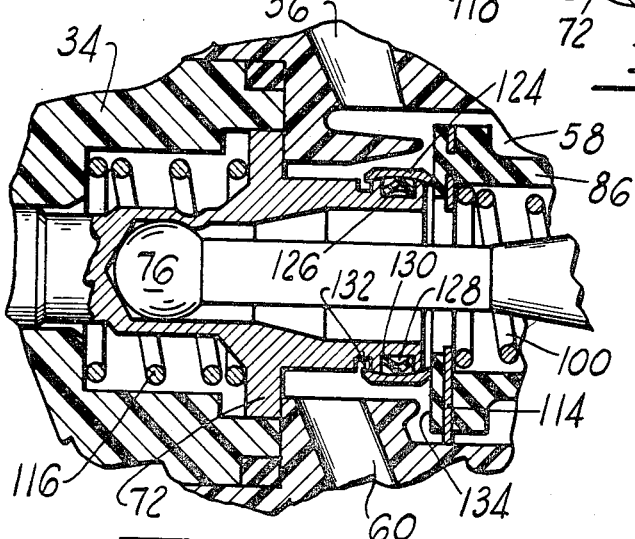

FIGURE 3 is another enlarged cross sectional detail of the movable wall of the servomotor containing the valve elements with additional elements to provide the important connection between the brake pedal and the master cylinder of FIGURE 1 being shown, and with a modification of the swivelling means between the movable valve seat and the flexible poppet with respect to that shown in FIGURE 2; and FIGURE 4 is a still further modification which may be employed in accomplishing the swivelling action between the movable valve seat and the flexible poppet in accordance with the principles of this invention.

DETAILED DESCRIPTION

In more detail, and with reference to FIGURE 1, there is shown a power brake servomotor 10 for actuating a master cylinder 12 providing hydraulic pressure to brake mechanisms 14 and 16 of an automobile via conduits 18 and 20 from the master cylinder. The power brake mechanism 10 is actuated by means of a brake pedal 22 pivotally connected as at 24 to the vehicle structure, and connected by means of a push rod 26 to the valving mechanisms within a movable wall 28 of the servomotor.

As seen, the movable wall 28 comprises a rolling diaphragm 30 sealingly affixed in grooves 32 to a plastic wall 34 and clamped between shoulders 36 and 38 of the portions of the shell of portions 40 and 42 of the housing for the servomotor 10.

As will appear in more detail hereinafter, the wall 28 is operatively connected to a force transmitting rod 44 which extends beyond the shell portion 40 of the housing for the servomotor 10 to operate a piston means (not shown) within the master cylinder 12. It will be understood by those skilled in the art to which this invention relates that there is a seal about the opening through the shell portion 40 and the force transmitting rod 44. A return spring 46 maintains the wall 28 in its rearmost attitude, as seen in FIGURE 1, during the non-actuated condition of the valving elements whereby vacuum communicated from an engine intake manifold 48 via a conduit 50 through a vacuum check valve 52 to a chamber 54 passes by way of a passage 56 to a valve chamber 58 within the wall 28, and thence about the valve elements thereof via a passable 60 of the movable wall to a control chamber 62. This means that in the released attitude the movable wall 28 is suspended in vacuum. The passages in the movable wall, aforementioned, are shown with reference to FIGURES 2, 3 or 4.

With more particular reference now to the valving details, attention is directed to FIGURES 2, 3 and 4 showing that the movable wall 28, and more particularly a plastic hub section 34 thereof is formed with the valve chamber 58 therein and has depending shoulders 64 and 66 facing rearwardly in the boss 68 that projects rearwardly of the shell portion 42 via a seal through an opening in the housing about the boss 68. In order to prevent contaminants from entering the servomotor, a rubber boot 70, see FIGURE 1, is affixed to the shell portion 42 and the push rod 26 over the rearwardly projecting boss 68.

The innermost shoulder 66 forms a fixed valve seat between the passages 56 and 60. A movable valve element 72 is slidably arranged within the valve chamber to have a reaction head 74 guided by the plastic hub 34. This movable valve element is counterbored to provide a receptacle for the head 76 of the push rod 26 that upon receipt therein is pinched as at 78 to maintain the connection of the movable valve elements 72 and the push rod 26. It may also be provided with a serrated surface 80 for the receipt of a resilient seat 82, or it may be formed as a rearwardly facing valve seat of metal.

The valve poppet comprises a rubber or similarly resilient member having a supporting flange 84 connected by means of a diaphragm portion 86 to a valve flange 88 having a reinforcing member 90 bonded or formed therewith for providing a valve face.

In FIGURE 2 this reinforcing member 90 is constructed to have a rubber face 92 outwardly of a surface of revolution 94 and with a depending shoulder 96 behind the surface of revolution. Within the surface of revolution an annular member 98 having an exterior surface of revolution is assembled to the reinforcing member 90, which annular member 98 may or may not be of resilient construction. The annular member 98 may be assembled to have a frictional contact with the surface of revolution 94 of the reinforcing member 90 of a predetermined length so as to prevent leakage between the ring 98 and the member 90 or in the preferred form is provided with a wiper seal 99. This link is short of the shoulder 96 so as to permit the annular member 98 to swivel in any and combined directions. The assembly of the structure of FIGURE 2 is completed by the placing of a valve biasing spring 100 and a valve return spring 102 between the member 90 and a plate 104 underlying the supporting flange 84, respectively, and a snap ring 106 affixed to the push rod 26. The rod 26 may be formed with a ridge in place of the provisions for the snap ring 106 for the springs 100 and 102.

3,410,178

3

With respect to the modification of FIGURE 3 it is seen that a swivelling ring 108 is provided on the movable valve element 72 adjacent its rearward edge spaced from shoulder 110 so as to permit free swivelling in any direction or in any combination of directions. In this instance, the flexible poppet has its valve flange 112 of unit construction reinforced by a plate 114 which is molded with the poppet. Aside from the fact that the valve return spring 116 has been located between the hub 34 and the movable valve element 72, the only other modification between this valve structure and that of FIGURE 2 is in the means of connecting the end 76 of the push rod 26 to the movable valve element 72. As seen, this involves the use of a rubber grommet 118 and a snap fitting plate 120.

One other thing that deserves mentioning at this point is the showing in FIGURE 3 of the reaction mechanism involving a rubber disc 121 between head 122 of the force transmitting rod 44 and the hub of the plastic wall 34. As seen, the valve chamber 58 is opened to the rear side of the disc, and the disc serves to not only convey a proportion of the resistance to movement of the force transmitting rod 44 to the head 74 of the movable elements 72, but also to seal the valve chamber 58 from the chamber 54 of the servomotor 10.

With reference now to FIGURE 4 there is shown a still further modification of the means of providing a swivelling ring 124 on the movable valve element 72 by means of a seal 126 compressed between a groove 128 and the inner surface of revolution 130 of the ring 124. In this instance the movable valve element is further grooved as at 132 to permit the universal action of the ring 124, and the ring 124 is of a dimension to project rearwardly beyond the movable valve element 72 to engage the valve face 134 of the flexible grommet type valve.

It may thus be readily understood that with any of the modifications shown in FIGURES 2, 3 and 4 that with the pivotal action of the brake pedal 22 acting on the reciprocating push rod 26 so that there may be an angular displacement of the movable valve element 72 that the swivelling members 98, 108 or 124 may align themselves with the face of the flexible annular valve poppet so that there is an equal seating force about the periphery of the ring or the annular portion of the movable valve element, as seen in FIGURE 2.

Having described an operative construction of my invention, it is now desired to set forth the protection sought for the invention by the following claims.

I claim:
1. A servomotor means comprising:
   a housing;
   a movable wall in said housing dividing said housing internally into first and second variable volume chambers, said wall having a valve chamber therein with passage means from each of said chambers leading thereto and a valve seat on said wall in said valve chamber between a first portion of said passage means open to said first variable volume chamber and a second portion of said passage means open to said second variable volume chamber, said wall further having a boss slidably mounted through an opening of said housing to support said wall therein, said boss having fluid inlet means thereinto leading to said valve chamber;
   a movable valve means operatively connected to said movable wall to be operably arranged in said valve chamber, said valve means having a portion thereof swivelable to accommodate angular variations between it and another portion thereof with one of the portions arranged to cooperate with said valve seat and together so as to control communication of said first and second portions of said passage means and said fluid inlet means to one of said first and second portions after the termination of communication thereof;

4 operator-operated means operatively connected to said movable valve means;
   force transmitting means operatively connected to said movable wall and said housing; and
   means to communicate a fluid pressure source within said housing which contrasts with that at said fluid inlet means of said boss.

2. A servomotor means according to claim 1 and further comprising reaction means between said force transmitting means and said movable wall which also functions to seal said valve chamber which reaction means cooperates with a portion of said valve means to convey a proportion of the resistance to said force transmitting means to said operator-operated means which is connected to said portion.

3. A servomotor means according to claim 1 wherein said movable valve means comprises a flexible poppet having a mounting flange connected to said boss and a valve flange projecting into said valve chamber with means to bias said valve flange into said valve chamber, and a movable valve element slidably carried by said movable wall with means to bias said movable valve element towards said valve flange, said movable valve element being connected to said operator-operated means, said movable valve element having a ring universally mounted thereto whose lip forms a seat facing said valve flange.

4. A servomotor means according to claim 1 wherein said movable valve means comprises a flexible poppet having a mounting flange connected to said boss and a valve flange projecting into said valve chamber with means to bias said valve flange into said valve chamber, and a movable valve element slidably carried by said movable wall with means to bias said movable valve element towards said valve flange, said movable valve element being connected to said operator-operated means, said valve flange having a universally mounted ring accommodating angular misalignment of said poppet in said valve chamber to prevent such from creating valve leak.

5. A servomotor means according to claim 1 wherein said movable valve means comprises a flexible poppet having a mounting flange connected to said boss and a valve flange projecting into said valve chamber with means to bias said valve flange into said valve chamber, and a movable valve element slidably carried by said movable wall with means to bias said movable valve element towards said valve flange, said movable valve element being connected to said operator-operated means, said valve flange having an outer face aligned with said valve seat of said movable wall and an inner face aligned with said movable valve element, said inner face in the form of a ring universally mounted to said poppet whose forward edge forms said inner face substantially flush with said outer face under normal conditions that permits angular misalignment of said poppet and said movable valve element without creating valve leak when they are lapped.

6. A servomotor means according to claim 3 wherein said ring is mounted to said element by a seal retained in a groove of said element adjacent the edge thereof which seal has line contact with an inner surface of revolution of said ring.

7. A servomotor means according to claim 6 wherein said inner surface of revolution for said ring is of lesser diameter than the external diameter of said seal.

8. A valve comprising:
   an operator-operated means;
   an annular flexible poppet having a supporting flange and a resilient valve flange;
   a movable valve element connected to said operator-operated means;
   means to permit angular misalignment of said poppet and said element, which means is operatively arranged between said poppet and said element; and
   spring means, acting through the operator-operated means, operatively connecting said poppet and said element to normally abut same with said means therebetween to seal the interior of said poppet from the exterior of said element.

9. A valve according to claim 8 wherein said means includes a ring universally mounted to said poppet.

10. A valve according to claim 8 wherein said means includes a ring universally mounted to said element.

11. A valve according to claim 9 wherein said ring is universally mounted to said poppet by a reinforcing member affixed to said resilient flange, said reinforcing member having an exterior fixed resilient face with said ring interiorly thereof having an edge substantially flush with said face and an edge spaced from said member to permit swivelling.

12. A valve according to claim 11 wherein the spring means has a portion thereof between the operator-operated means and said reinforcing member and another portion between said operator-operated means and said supporting flange to draw said poppet and said element together with said ring abutting a seat on said element interiorly of said resilient face.

13. A valve according to claim 10 wherein said ring is mounted to said element by a seal carried by said element and in slight compression between said element and an inner surface of revolution for said ring.

14. A valve according to claim 13 wherein said ring extends rearwardly towards said poppet beyond the rearward face of said element and said element has a groove ahead of the seal connection with said ring to permit swivelling of said ring about said element.

15. A valve according to claim 8 within a valve chamber of a movable wall of a pressure differential type servomotor with a fixed valve seat about said element ahead of said poppet with passages from one side of said wall to one side of said fixed valve seat and from the other side of said wall to the other side of said valve seat whereby said valve controls fluid pressure communication from one passage to the other and from within said poppet to one of said passages to the exclusion of the other of said passages.

16. The structure of claim 15 with a first spring between said operator-operated means and said poppet and a second spring between said element and said wall.

17. A valve according to claim 11 wherein said ring has an exterior surface of revolution and said member has an interior surface of revolution frictionally engaging over a predetermined length to prevent leakage therebetween.

18. A valve according to claim 10 wherein said element is provided at its rearward edge with a surface of revolution about a hollow portion spaced from a shoulder and said ring has an exterior surface of revolution in frictional engagement with the surface of revolution of said element a predetermined distance to effect sealing therebetween and short of said shoulder to permit swivelling of said ring in any direction or combination of directions.

19. A fluid pressure servomotor and the like including a housing having an internal axially extending chamber therein, a movable wall in the chamber with the wall having a boss axially extending through one end of the housing which boss has an axially extending internal valve chamber stepped down in at least two successive stages to provide inner and outer shoulders facing axially outwardly of the valve chamber with the inner shoulder forming a fixed valve seat for cooperation with an annular flexible poppet member affixed in the boss by a supporting flange thereof abutting the outer shoulder and having an interference fit with the sidewalls of the valve chamber thereabout which is normally held away from the inner shoulder by a control member positioned axially inwardly of the poppet member which control member is adapted to move axially with respect to the wall whereby inward movement is followed by the poppet until it abuts the inner shoulder so that further inward movement frees the control member from the poppet with springs to oppose such inward movement characterized by the improvement of:

a means between said control member and said poppet to permit angular misalignment therebetween, which means equal seating forces around the annular poppet.

20. The structure of claim 19 wherein the means is a universally mounted ring.

21. The structure of claim 19 wherein the means is an annular member having a surface of revolution connecting it to said poppet interiorly of its face cooperating with the inner shoulder forming the valve seat within the valve chamber.

22. The structure of claim 19 wherein the means is an annular member having a surface of revolution between it and the control member.

References Cited

UNITED STATES PATENTS

| | | | |
|---|---|---|---|
| 2,717,757 | 9/1955 | Bowlzer | 251—86 |
| 2,740,425 | 4/1956 | Garland | 251—86 |
| 2,875,975 | 3/1959 | Hajny | 251—86 |
| 3,125,003 | 3/1964 | Hoekstra | 91—376 |
| 3,141,474 | 7/1964 | Gentzel | 251—86 |

PAUL E. MASLOUSKY, *Primary Examiner.*